Dec. 27, 1955     R. E. BERG     2,728,275
MACHINE FOR MAKING FIBRE DRUMS
Filed Feb. 19, 1954     6 Sheets-Sheet 2

FIG. 3.

INVENTOR.
ROY E. BERG
BY
Mock & Blum
ATTORNEYS

FIG. 4.

INVENTOR.
ROY E. BERG

Dec. 27, 1955    R. E. BERG    2,728,275
MACHINE FOR MAKING FIBRE DRUMS
Filed Feb. 19, 1954    6 Sheets-Sheet 4

FIG. 5.

INVENTOR.
ROY E. BERG
BY
Mock & Blum
ATTORNEYS

R. E. BERG 2,728,275

MACHINE FOR MAKING FIBRE DRUMS

Filed Feb. 19, 1954

INVENTOR.
ROY E. BERG
BY
*Mock & Blum*
ATTORNEYS

United States Patent Office 2,728,275
Patented Dec. 27, 1955

2,728,275

MACHINE FOR MAKING FIBRE DRUMS

Roy E. Berg, Great Neck, N. Y., assignor to Fibre-Drum Corporation, Long Island City, N. Y., a corporation of New York Application February 19, 1954, Serial No. 411,374

3 Claims. (Cl. 93—81)

This invention relates to an improvement in machines for making fibre drums.

In particular, this invention relates to a machine which may be used in continuous operation to wind lengths of kraft paper into convolute tubes, it being understood that said tubes when capped are the fibre drums above referred to.

Such fibre drums are well known per se, and have been manufactured in a variety of lengths and diameters so as to have varied cubical or gallon capacities. Said fibre drums are light and sturdy and highly suitable for shipment of many industrial products.

It has been found that production of fibre drums should be carried out in the areas where the drums are sold, in view of high freight rates. If the production plants for the drums are located too far from the areas in which the customers are located, it is difficult to ship the empty drums on an economical basis. However, in the past it has been difficult to establish a large number of small decentralized plants for the manufacture of fibre drums, because the production of drums has not been sufficiently automatic for economical production in small plants. It is possible to produce drums of a given cubical capacity, but with different diameters and lengths, in order to permit shipment of drums nested within each other. While this increases the economical shipping range, this type of production results in the necessity for a tremendous number of drum sizes which is disadvantageous to customers who buy the drums.

With the use of my improved, automatic machine for forming the convolute tubes, and with the resultant reduction in manpower required for the production of tubes, it is possible to establish small plants on an economical basis, located near the areas of use of the drums. It is also possible to standardize drum sizes to a considerable extent.

In acordance with a preferred embodiment of the invention, means are provided for unrolling hard finished kraft paper, approximately 0.010" thick, from a roll of said paper and to feed said kraft paper continuously in a forward longitudinal direction. The paper is carried successively over a pan of sodium silicate or other glue and over a pan of hot asphalt. The paper is then wound upon a mandrel located forwardly of said pans.

As an important feature of the invention, a mandrel holder is provided having a plurality of collapsible mandrels mounted thereon. At a given instant, only one of said mandrels is in position to receive a web of paper. This winding mandrel is rotated until a selected number of turns of the paper are wound around its periphery. Means are provided for automatically turning the mandrel holder a selected portion of a revolution immediately after the completion of the winding of the 14 turns of paper upon the winding mandrel, so as to remove said winding mandrel out of paper receiving position and to move another mandrel into receiving position. The movement of the web of paper is not stopped during this indexing movement, which is extremely rapid.

Means keyed to the turning movement of the receiving mandrel are provided for transferring glue from the glue pan to one face of the paper over a selected length thereof and also for transferring asphalt from the asphalt pan to said face of the paper over a selected length thereof. In particular, in said preferred embodiment, the paper is coated in such a way that the first turn of paper wound upon the winding mandrel is uncoated, a plurality of successive turns are coated with glue, the next successive layers are coated with asphalt and finally, the outer turns are coated with glue. Further means are provided and are also keyed to the rotation of the mandrel to cut the web of paper at such a point that exactly the selected number of turns thereof are wound upon the receiving mandrel.

It will be apparent that each mandrel is advanced successively from its winding station through a number of other stations and then back to the winding station. Means are provided for automatically collapsing each mandrel while it is in a selected station other than the winding station, so as to make it possible to remove the completed convolute tube therefrom. This may be done readily, because the mandrel is supported at only one end, except while it is in the winding station.

Other objects and advantages of this invention will become apparent from the following description, in conjunction with the annexed drawings, which discloses a preferred embodiment of the invention. The drawings are substantially to scale of a working model of the invention.

*The coating and cutting stations*

Upon reference to the drawings in detail, it will be noted that they show a longitudinally extending frame which is generally designated by the reference numeral 10.

Figures 1, 2:
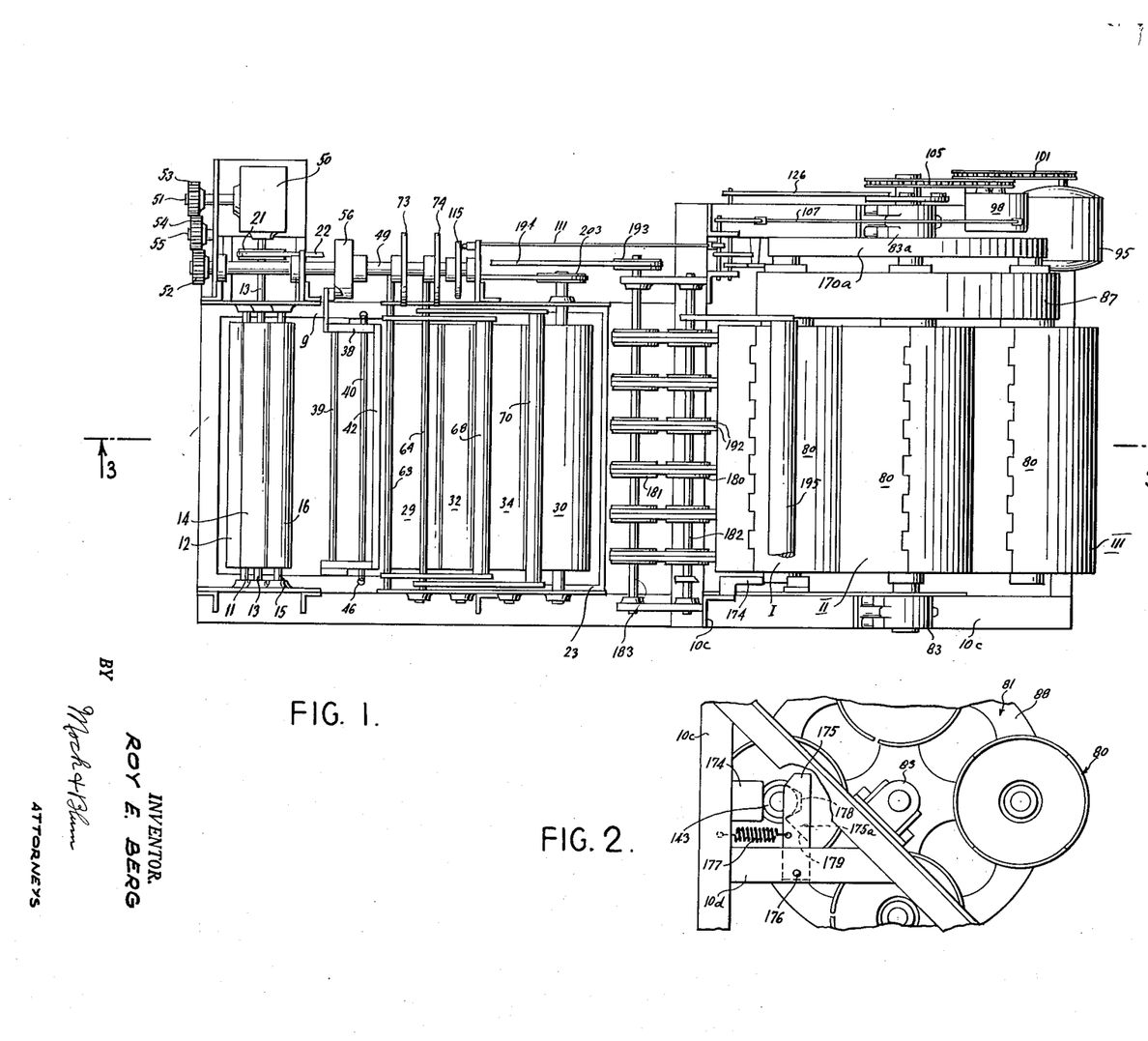
Fig. 1 is a top plan view of the complete machine, certain of the parts being removed.
Fig. 2 is a partial side elevation of the machine, showing a portion of the supporting mechanism for the winding drums.
Figure 3:
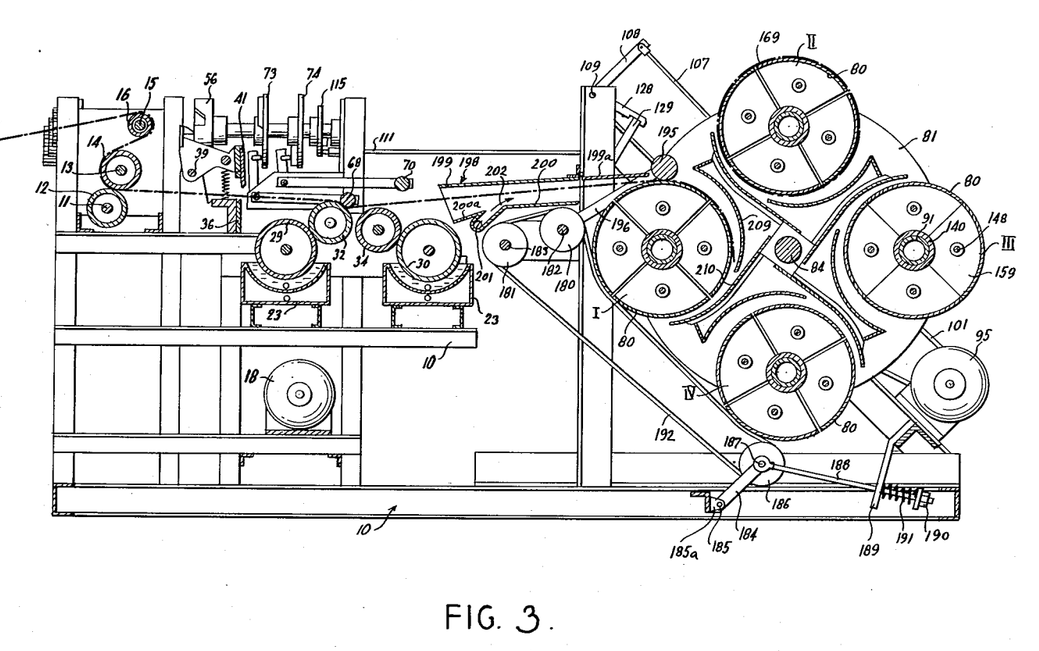
Fig. 3 is a section on line 3—3 of Fig. 1, and shows in broken lines a web of paper being fed through the machine.

As shown in Figs. 1 and 3, at the rear or input end of frame 10, and slightly below the top thereof, a lateral shaft 11 is journalled in suitable bearings at the respective sides of the frame. Said shaft 11 carries an idler roller 12. Lateral drive shaft 13 is also journalled in suitable bearings at the respective sides of frame 10, and also extends outwardly beyond one side arm 9 of frame 10. Drive roller 14 is mounted on shaft 13 and is located above roller 12. The axis of roller 14 is located slightly forwardly of the axis of roller 12, and said rollers frictionally engage each other.

A further lateral shaft 15 is turnably supported by frame 10 similarly to shafts 11 and 13, and a tensioning roller 16 is mounted on said shaft 15. Roller 16 is positioned above and is spaced from roller 14, and the axis of roller 16 is located somewhat forwardly of the axis of roller 14.

A web of paper 17, shown in broken lines in Fig. 3, is threaded over and in front of roller 16, behind roller 14 and between rollers 12 and 14 and then extends longitudinally forwardly thereof.

Figure 4:
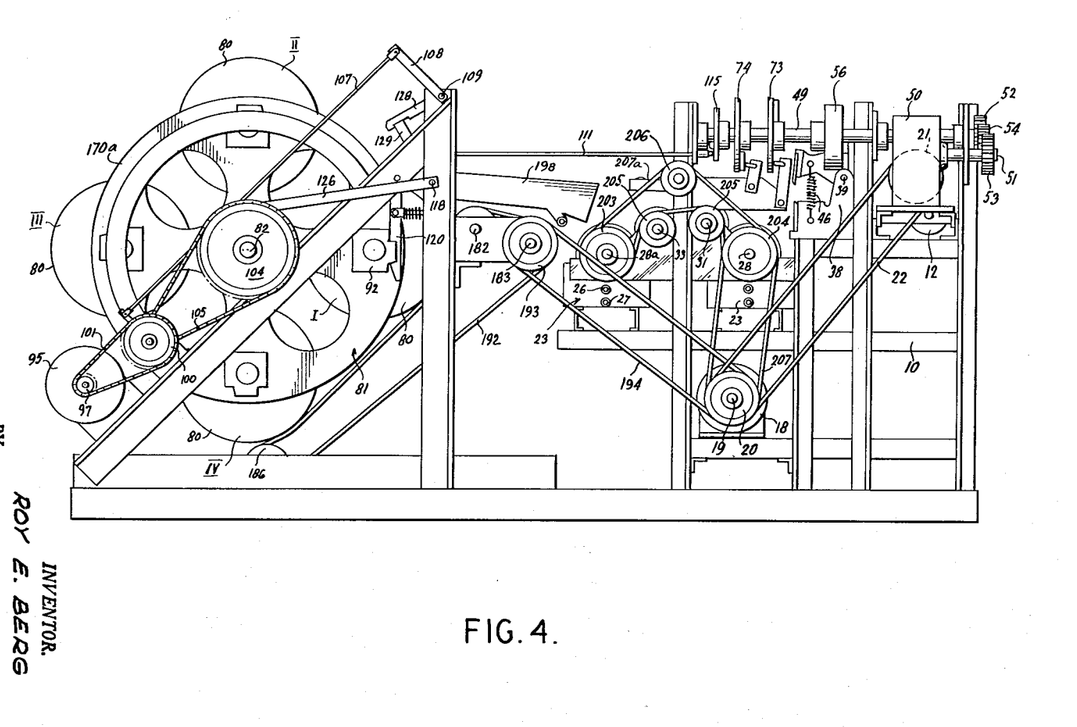
Fig. 4 is a side elevation of the complete machine, viewed from the other side as taken in Fig. 2.

As is best shown in Fig. 4, in order to drive roller 14, motor 18, which may be an electric motor, is mounted upon frame 10 near the bottom rear thereof. The output shaft 19 of motor 18 extends laterally out of the casing beyond frame arm 9. A plurality of pulleys, all of which are generally designated by the reference numeral 20, are mounted upon shaft 19. A further pulley 21 (Fig. 1) is mounted on shaft 13, outwardly of frame 10. Said pulley 21 is alined with one of the pulleys 20 and is coupled thereto by pulley belt 22, so that motor 18 drives roller 14.

A plurality of coating stations are mounted on the machine forwardly of drive roller 14. The coating stations are shown in detail in Fig. 8. In this embodiment, there are two such coating stations, one for providing glue and the other for providing a water barrier coating, the latter mentioned coating station being located forwardly of the first mentioned coating station.

Figure 8:
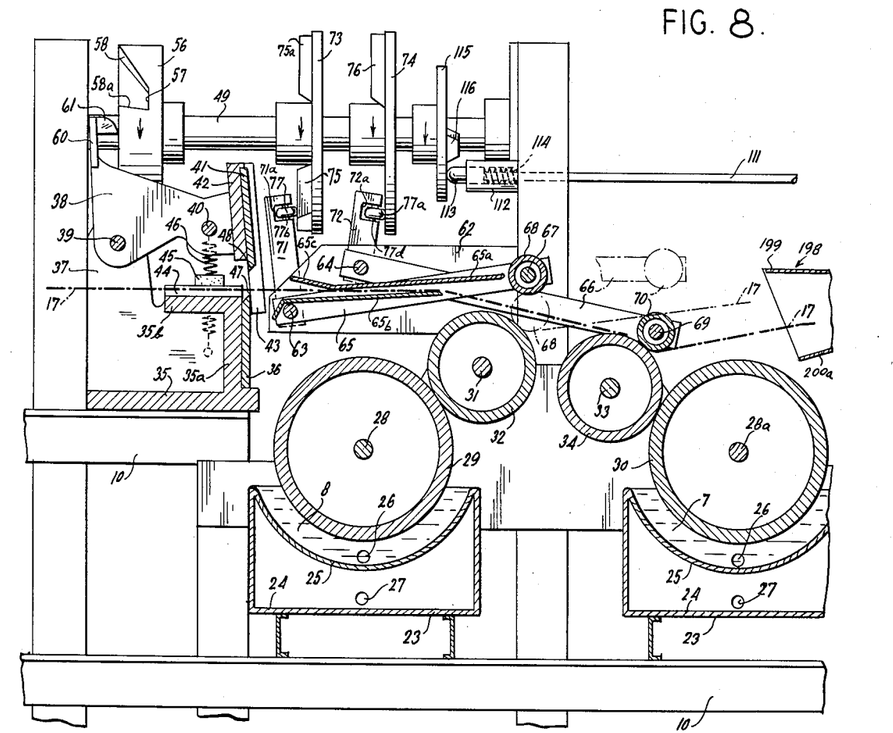
Fig. 8 is an enlarged detail of a portion of Fig. 3, showing certain of the moving parts in a different position from that of Fig. 3.

Each said coating station includes a pan 23 which is fixed to frame 10 by any suitable means. Each said pan 23 has a hollow bottom portion 24, the upper face of said bottom portion 24 being in the shape of a concave, laterally extending trough 25. Said trough 25 may have end walls with one or more feeding openings 26. Said hollow bottom portion 24 has one or more openings 27 in its end walls to permit circulation of steam or the like therethrough. The rear trough 25 is preferably filled with sodium silicate 8, and the front trough 25 is preferably filled with asphalt 7. The steam circulating in the hollow bottom portions 24 of the pans 23 serves to keep the contents of the troughs in liquid form if heat is necessary for that purpose.

Lateral shafts 28 and 28a are respectively journalled in suitable bearings in the sides of frame 10 above the pans 23. A glue take-up roller 29 is mounted upon the rear shaft 28 and extends downwardly well below the surface of the glue 8 in the rear trough 25. An asphalt take-up roller 30 is mounted upon shaft 28a and extends well below the surface of the asphalt in the front trough 25. Said rollers 29 and 30 are preferably of the same diameter and are on the same horizontal level and are longitudinally spaced.

Lateral shaft 31 is journalled in suitable bearings in the sides of frame 10 above and forwardly of shaft 28, and carries roller 32. Said roller 32 frictionally engages roller 29 at a level between the uppermost point of roller 29 and the frontmost point thereof, as is clearly shown in Figs. 3 and 8. Similarly, lateral shaft 33 is journalled in suitable bearings in the sides of frame 10 rearwardly of the shaft 28a and carries roller 34. Said roller 34 frictionally engages roller 30 at a level between the top of roller 30 and the rearmost point thereof. Rollers 32 and 34 are preferably of the same diameter, and the axis of roller 34 is preferably located slightly below the axis of roller 32.

Means are provided for continuously driving rollers 29, 32, 30 and 34, and are shown in detail in Fig. 4. Lateral shafts 28, 31, 33 and 28a protrude beyond the frame side arm 9. Pulley 204 is mounted upon shaft 28 and is coupled to one of the motor pulleys 20 by means of pulley belt 207.

Pulley 203 is mounted upon shaft 28a. Pulleys 205 are respectively mounted on shafts 31 and 33. Idler pulley 206 is mounted on frame 10 above the two pulleys 205, and is also turnable about a lateral axis. A further pulley (not shown) is mounted on shaft 28 inwardly of pulley 204. Pulley belt 207a extends around this further pulley, over pulley 205, around pulley 203 and over the pulleys 205. As a result, motor 18 drives the rollers 32 and 34 in a clockwise direction and rollers 29 and 30 in a counterclockwise direction, as taken in Fig. 8.

A knife station, which is shown in detail in Fig. 8, is located between drive roller 14 and the glue station. Said knife station includes a horizontal bracket 35 fixed to frame 10 by any suitable means. Said bracket 35 has a laterally extending, upstanding front end flange 35a, to the front face of which a laterally and vertically extending knife blade 36 is fixed.

Said bracket 35 extends across the width of frame 10 and has affixed thereto upstanding side plates 37. Vertically and longitudinally extending levers 38 are respectively connected to the respective plates 37 at the inner faces thereof by means of a common lateral pivot rod 39. Said levers 38 are also connected to each other forwardly of rod 39 by means of rod 40. At their front ends, levers 38 carry an arm 42 which extends across the width of frame 10. A second knife blade 41 is fixed to the front, transverse face of arm 42. Plates 43 are fixed to the front face of arm 42 laterally outwardly of blade 41 and extend below the level of blade 36. Said plates 43 are located laterally outwardly of the web of paper 17 and tend to limit lateral movement thereof.

Flange 35a is integral at its upper end with a horizontal, rearwardly extending flange 35b. Flange 35b carries on its upper face a pair of blocks 44 which are vertically alined with the respective levers 38 and which carry on their upper faces respective resilient blocks 45 which may be made of foam rubber or the like. Rod 40 is connected to any suitable frame member (not shown) by one or more springs 46 so as to urge knife blade 41 downwardly. The paper web 17 passes over bracket 35 and between the members 44.

The levers 38 are normally held in a position so as to hold knife blade 41 in its upward position of Figs. 3 and 8, against the biasing action of spring 46. When levers 38 are released, the action of spring 46 carries knife blade 41 down with considerable force, and the cutting edges 47 and 48 of the knife blades are cooperatively shaped so as to cut the web of paper. In the downward movement of knife blade 41, the lower edges of the levers 38 strike the respective resilient blocks 45, so as to cushion the drop of the knife blade 41, the lower limit position of knife blade 41 being reached when the cutting edge 48 of blade 41 has passed a small fractional part of an inch below the cutting edge 47 of the stationary blade 36.

The web of paper 17 is carried between the rollers 12 and 14 as previously stated, between the normally spaced knife blades 36 and 41, and over and past the glue roller 32 and the asphalt roller 34. Means which will now be described in detail are provided for engaging successive selected lengths of web 17 with the glue roller 32 and the asphalt roller 34 and for actuating the knife mechanism to cut selected lengths of the web.

*Control of coating and cutting operations*

As is best shown in Fig. 1, a longitudinal, horizontal shaft 49 is turnably supported outwardly of frame arm 9 by means of suitable angle irons and brackets fixed to frame 10, and suitable bearings mounted on said brackets. Shaft 49 is located above shaft 13. The outer end of shaft 13 extends into a gear reduction box 50 which is supported by a suitable bracket fixed to frame 10. Gear reduction box 50 has a rearwardly longitudinally extending output shaft 51 which is located laterally outwardly of shaft 49. The rear end of shaft 49 carries gear 52. The rear end of shaft 51 carries gear 53. Said gears 52 and 53 are coupled by an intermediate gear 54 which is mounted upon a longitudinal stub shaft 55, which is turnably mounted upon a bracket extension of frame 10. Gears 52, 53 and 54 are all of the same size, so that gear 52 turns in the same direction and at the same speed as gear 53. In the working model of the invention shown in the drawings, the gear reduction within box 50 is such that shaft 49 turns at approximately $1/44$ of the speed of shaft 13. Shaft 49 turns in a counterclockwise direction as viewed from the front of the machine.

As is shown in detail in Fig. 8, rear cam wheel 56 is mounted upon shaft 49. The rear face of cam 56 is planar and has a recess 57 which has a cam shaped trailing face 58 and a leading face 58a which is approximately perpendicular to the face of the cam. Said trailing edge 58 slopes forwardly toward said leading edge 58a.

The lever 38 which is proximate to shaft 49 carries an upstanding projection 60, said projection 60 carrying a forwardly extending cam member 61. This cam member 61 has a downwardly sloping upper face and normally rides upon the rear face of cam 56. The lower face of cam 61 is substantially horizontal. Recess 57 is located so that at one point during a revolution of shaft 49, cam projection 61 falls into recess 57, thus permitting knife blade 41 to drop and cut the paper. Almost instantly, the upper face of cam projection 61 rides out of recess 57 upon the cam surface 58.

Frame 10 carries a pair of side plates 62. A pair of lateral shafts 63 and 64 extend turnably between said plates 62, and protrude laterally outwardly of frame arm 9. Shaft 63 is located rearwardly of and below shaft 64. A pair of lever arms 65 are fixed to shaft 63 adjacent the respective plates 62 and extend forwardly of shaft 63. A pair of lever arms 66 are fixed to shaft 64 outwardly of levers 65 and extend longitudinally and forwardly. The front ends of levers 65 carry a lateral shaft 67 upon which idler roller 68 is turnably mounted. The front ends of levers 66 carry a lateral shaft 69 upon which idler roller 70 is turnably mounted.

The portion of shaft 63 which protrudes outwardly of frame arm 9 has fixed thereto a generally upstanding arm 71. This arm 71 has a cut-out or recess 71a near the top thereof and communicating with the front face thereof. A bearing wheel 77 is mounted within said recess 71a upon a pivot 77b whose axis is parallel to the axis of arm 71. The pivot 77b is secured in the upper and lower walls of recess 71a by any suitable means. Bearing wheel 77 projects slightly forwardly of the front face of arm 71. The portion of shaft 64 located outwardly of frame arm 9 has fixed thereto a generally upstanding arm 72. Said arm 72 has a recess 72a corresponding to recess 71a. A bearing wheel 77a corresponding to the bearing wheel 77 is mounted within recess 72a by means of a pivot pin 77d corresponding to pivot pin 77b. Bearing wheel 77a projects slightly forwardly of the front face of arm 72.

Cam wheel 73 is fixed to shaft 49 in front of arm 71. Said cam wheel 77 has a pair of cam projections 75 and 75a of selected size and shape mounted upon its rear face. These cams 75 and 75a are circumferentially spaced about the periphery of said rear face of said cam wheel 77. Cam wheel 74 is fixed to shaft 49 in front of arm 72. Said cam wheel 74 has a cam projection 76 of selected size and shape mounted on its rear face. The cams 75, 75a and 76 are shown somewhat schematically in the drawings, since their size and shape can be varied, depending upon the manner in which it is desired to coat the paper 17.

Upper and lower deflecting plates 65a and 65b extend laterally between the respective lever arm 65 and are secured thereto by any suitable means. These plates 65a and 65b extend in a generally horizontal direction and are generally parallel to each other. However, the rear portion 65c of plate 65a slopes upwardly, so that the rear portion of the gap between the two plates 65a and 65b is of increased height. The front portion of plate 65a projects forwardly of plate 65b.

In describing the coating operations and control thereof, it will be assumed (as will become evident below) that web 17 is held under tension forwardly of and above the level of the rollers 32 and 34 while the paper is being coated. Fig. 8 shows in solid lines the position of the parts when asphalt is being applied to the paper. In this position, bearing wheel 77a rides directly upon the rear face of cam wheel 74, permitting the front ends of the lever arms 66 to drop so that roller 70 holds the paper 17 against the asphalt roller 34. Also in this position, bearing wheel 77 rides upon cam 75, raising the front ends of the lever arms 65 and holding the idler roller 68 away from the glue roller 32. The paper 17 passes over bracket flange 35b and between the upper and lower deflection plates 65a and 65b (the flange 65c serving to help guide a new length of paper into position between the plates 65a and 65b after the old length has been cut by the knife blades 36 and 41). In the position of Fig. 8, the front edge of plate 65b bears against the paper 17 and holds it above and out of registration with the glue roller 32. At the same time, the idler roller 70 presses down upon the paper 17, against the tension exerted on the web forwardly and rearwardly of the asphalt station, to hold the paper in frictional abutment with the asphalt roller 34.

In the broken line position of Fig. 8, corresponding to the position of the parts shown in Fig. 3, cam wheel 77a rides upon cam 76, so that roller 70 is held above and away from asphalt roller 34. At the same time, bearing wheel 77 rides directly upon the rear face of cam wheel 73 so that the lever arms 65 are lowered. Idler roller 68 holds the web of paper 17 frictionally against the glue roller 32, the corresponding lowering of the plate 65b accommodating the changed position of the web of paper.

In one turned position of shaft 49, bearing wheel 77a and bearing wheel 77 respectively ride simultaneously upon the respective cam projections 76 and 75a, so that both of the idler rollers 70 and 68 are raised. As a result, the web 17 is carried above and spaced from both of the rollers 32 and 34, so that the web is uncoated.

*The mandrel holder*

Figure 6:
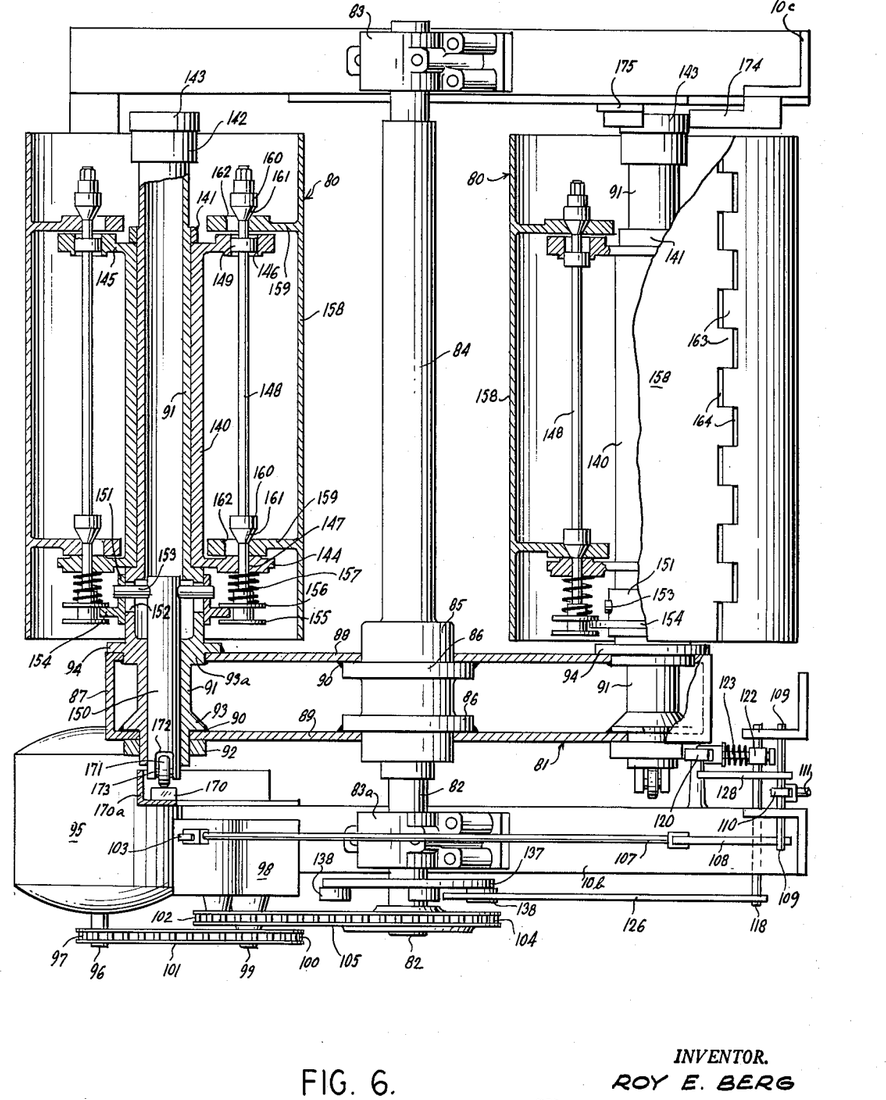
Fig. 6 is a section on line 6—6 of Fig. 5 and is partly broken away.

As is clearly shown in Fig. 6, mandrel holder 81 is supported by a lateral shaft 82 which is located near the front of the machine. One end of shaft 82 protrudes outwardly beyond the side of frame 10 at which frame arm 9 is located. Adjacent this end of shaft 82, shaft 82 is supported by a bearing mount 83a which is fixed to frame 10. The other end of shaft 82 is turnably supported by bearing mount 83 which is also fixed to frame 10. Shaft 82 has a portion 84 of increased diameter extending most of the distance between the bearings 83 and 83a. Adjacent bearing 83a, said shaft portion 84 has a shaft portion 85 of still greater diameter which serves directly as the mounting hub for the mandrel holder 81. Said hub 85 has a pair of preferably integral, transverse, circumferentially extending, laterally spaced flanges 86.

The mandrel holder 81 is essentially cylindrical in shape with a peripheral wall 87 and respective end walls 88 and 89. Wall 89 is the outermost of the two end walls and is proximate to the bearing mount 83a. Said walls 88 and 89 have central alined openings through which hub 85 extends, with flanges 86 respectively located in abutment with the inner faces of walls 88 and 89. Flanges 86 are respectively welded at 90 to the walls 88 and 89.

Figure 5:
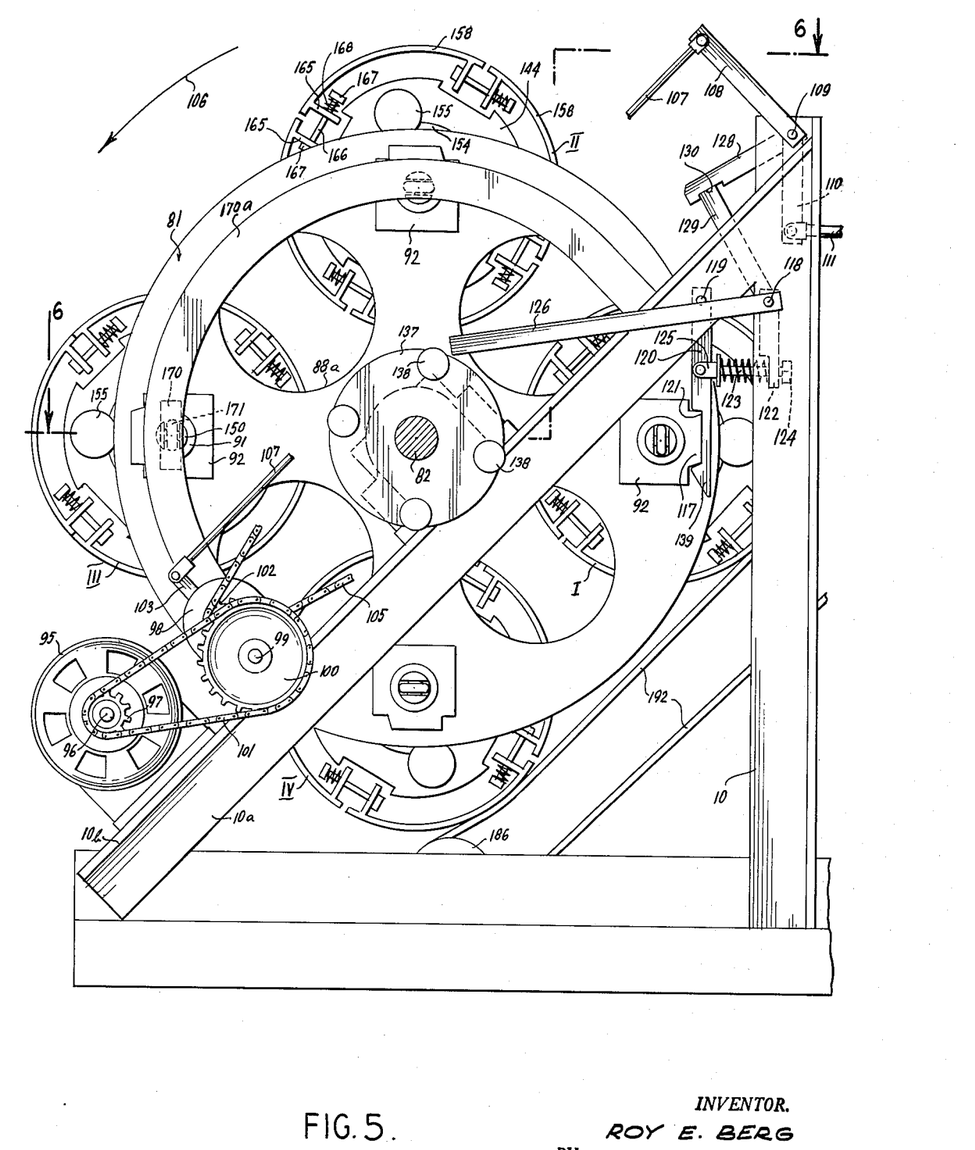
Fig. 5 is an enlarged detail of a portion of Fig. 4, with the drive sprocket removed.

Optionally, as shown in Figs. 4 and 5, the end walls 88 and 89 of mandrel holder 81 may have cut-outs or openings 88a in order to lighten the weight of the mandrel holder.

Four hollow lateral shafts 91 are mounted within the mandrel holder 81 and are equally spaced around the circumference thereof. Each said shaft 91 extends through an opening in wall 89 and has an integral flange 93 which abuts the interior face of wall 89 and which may be welded thereto at 90. Inwardly of flange 93, shaft 91 has an enlarged portion 93a which extends through a suitable opening in wall 88 and which is welded thereto. Preferably, shaft portion 93a has a transverse peripheral flange 94 which abuts and is welded to the inner face of wall 88. Inwardly of the enlargement 93a, shaft 91 resumes the diameter of the portion which extends through wall 89.

The mandrel holder 81 is adapted to be turned one-quarter of a revolution intermittently by means of an electric motor 95 which is fixed to the frame angle iron 10a. This is clearly shown in Fig. 5. Angle iron 10a is fixed to frame 10 and extends forwardly and downwardly from a point above and behind shaft 82 to a point below and in front of said shaft 82. Angle iron 10a passes under shaft 82. Said angle iron 10a has a vertical leg and a cross-leg 10b, the motor 95 being mounted upon the upper face of said leg 10b, substantially as shown in Fig. 5. Motor 95 is located at the lower front end of the angle iron 10a. Motor 95 has an output shaft 96 upon which sprocket 97 is mounted.

A housing 98 for a conventional reduction gear train and a one-revolution clutch is fixed to angle iron leg 10b above and rearwardly of motor 95. Said clutch housing 98 has an input shaft 99 upon which sprocket 100 is mounted. Sprockets 97 and 100 are coupled by sprocket chain 101. Clutch housing 98 has an output shaft (not shown) upon which sprocket 102 is mounted. Clutch lever 103 protrudes forwardly and upwardly from the housing of clutch housing 98. When lever 103 is turned in a counter-clockwise direction, as taken in Fig. 5, the clutch in housing 98 is operated so as to temporarily couple the input sprocket 100 and the output sprocket 102, through the reduction gear train in housing 98, and permit one revolution of said sprocket 102, at lower speed than the speed of sprocket 100. The clutch automatically disengages after the single revolution of sprocket 102. Since the inner mechanism of housing 98 is conventional, it is not shown in detail.

A further sprocket 104 (Fig. 6) is mounted upon shaft 82 outwardly of bearing 83a and is coupled to sprocket 102 by sprocket chain 105. The drive ratios and the direction of drives are such that the single revolution of sprocket 102 produces a one-quarter revolution of shaft 82 and hence of mandrel holder 81, in the counter-clockwise direction of arrow 106 (Fig. 5).

Figure 7:
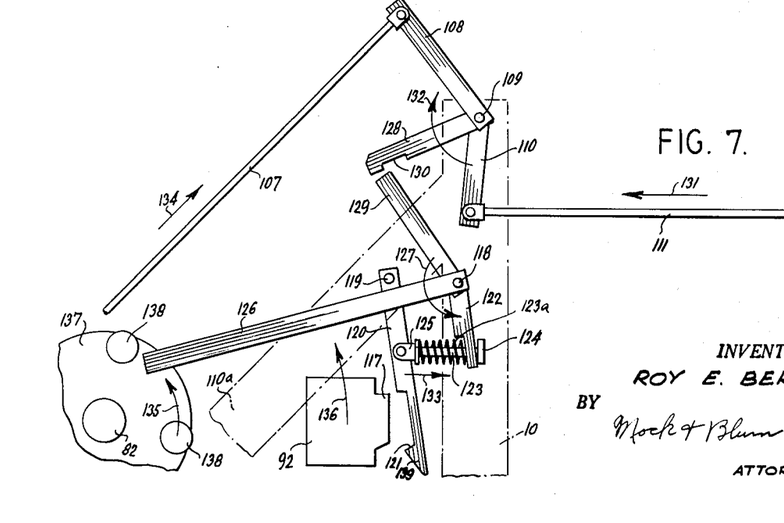
Fig. 7 is a detail of the locking mechanism of Fig. 5, said locking mechanism being shown in a different position from that of Figs. 4 and 5.

In order to operate lever 103, the free end thereof is coupled by link 107 to a further lever 108, which is in turn connected to frame 10 by lateral pivot 109 (see Figs. 5 and 7). This pivot 109 is located rearwardly and above shaft 82. A further lever 110 is fixed to pivot 109 and depends therefrom.

A longitudinal push rod 111 is pivotally connected to the lower end of lever 110 and extends rearwardly thereof. As is clearly shown in Fig. 8, the rear end portion of rod 111 extends slidably through the longitudinal bore of a bearing 112 which is fixed to frame 10. The rear end of rod 111 culminates in button 113. A suitable spring 114 within the bearing 112 is coupled to rod 111 so as to urge the button 113 rearwardly.

A further cam wheel 115 is fixed to shaft 49 forwardly of cam wheel 74. Button 113 is urged by spring 114 against the front face of cam wheel 115. Cam projection 116 is mounted on the front face of cam 115 and is positioned so that once during a revolution of shaft 49, button 113 rides upon said cam projection 116, so that rod 111 is pushed forwardly in the direction of arrow 131 (Fig. 7), thereby turning pivot 109 in the clockwise direction of arrow 132 (Fig. 7). This moves link 107 in the direction of arrow 134, thereby actuating the one-revolution clutch located within the housing 98.

It is necessary to insure accurate stopping of the mandrel holder 81 exactly at the conclusion of each one-quarter revolution indexing movement thereof. As is clearly shown in Figs. 5, 6 and 7, collars 92 are respectively mounted upon the mandrel shafts 91 laterally outwardly of mandrel holder wall 89. Each said collar 92 is substantially rectangular in shape and has a cam projection 117 on its radially outer face relative to the axis of the mandrel holder 81. Lateral pivot 119 is fixed to the vertical leg of angle iron 119 rearwardly of the rearmost position of the collars 92. Lever 120 is fixed to pivot 119 and depends therefrom. The front face of lever 120 has a cut-out 121 which is sized and shaped to receive the cam 117 of the rearmost collar 92, when the rearmost collar 92 is located on the level of the horizontal diametrical line of mandrel holder 81.

As shown in Figs. 5 and 7, means are provided for urging lever 120 rearwardly, in the direction of arrow 133, to clear cam 117 from recess 121. A further lateral pivot 118 is fixed to frame 10 rearwardly of pivot 119. Lever 122 is fixed to pivot 118 and depends therefrom. Longitudinal rod 123 extends slidably through a suitable opening in lever 122 and is provided with a stop 124 behind said lever 122. The front end of lever 123 is fixed to bracket 125, which is pivotally connected to lever 120 intermediate pivot 119 and cut-out 121. A further lever 126 is fixed to pivot 118 and extends forwardly and slightly downwardly therefrom. Said lever 126 urges pivot 118 in the counter-clockwise direction of arrow 127 (Fig. 7), so as to clear cam 117 from recess 121.

Means are provided for releasably maintaining lever 120 in its position of Fig. 5, in which cam 117 is locked in recess 121, and for returning lever 120 to its locking position after it has been permitted to move to its release position of Fig. 7. As shown in these views, lever 128 is fixed to pivot 109 and extends forwardly and downwardly therefrom. The lower face of lever 128 has a cut-out or recess 130. Lever 129 is fixed to pivot 118 and extends upwardly and forwardly therefrom. Compression spring 123a is mounted on rod 123 between bracket 125 and lever 122. In the position of Fig. 5, the upper end of lever 129 is retained in recess 130, and the action of lever 122 upon spring 123a urges lever 120 forwardly, so that cam 117 can be seated in recess 121. When lever 128 is raised by the forward movement of rod 111, lever 129 clears recess 130, and lever 126 is free to drop to move the parts to the position of Fig. 7.

In order to relock lever 129 in recess 130 (after the return of rod 111 to its normal position), collar or disc 137 is fixed to shaft 82 between bearing 83a and sprocket 104. The outer face of disc 137 has mounted thereon four lateral stub shafts 138 which are evenly spaced around the periphery of said disc 137. During a one-quarter revolution of mandrel holder 81, in the direction of arrow 136, one of the stubs 138 strikes the lower face of the free end portion of lever 126 and rocks said lever 126 upwardly, slightly past its rest position. Stub 138, which accordingly serves as a cam, then moves slightly past lever 126, as shown in Fig. 5. However, during the upward movement of lever 126, lever 129 again moves into recess 130, said recess 130 being slightly longer than the width of lever 129, as shown in Fig. 5, in order to accommodate the rocking of lever 126 past its rest position.

As a further result of the upward movement of lever 126, lever 122 acts upon the compression spring 123a and rocks lever 120 forwardly, slightly past its normal position. Just after cam stub 138 clears lever 126, the uprising cam projection 117 strikes the lower cam edge 139 of lever 120 and rocks lever 120 rearwardly against the action of spring 123, until projection 117 is located within recess 121, thereby stopping the turning of the mandrel holder 81 after exactly one-quarter of a revolution.

*The mandrels*

Each mandrel shaft 91 supports a collapsible mandrel 80. As is clearly shown in Fig. 6, sleeve 140 is turnably mounted upon shaft 91 inwardly of the shaft portion 93a. One end of sleeve 140 abuts the shoulder formed at the junction of shaft 91 with the inner end of shaft portion 93a. The other end of sleeve 140 abuts a collar 141 which is mounted on said shaft 91. This is clearly shown in Fig. 6. Beyond collar 141, inner bearing collar 142 is mounted upon the end of shaft 91, and outer bearing collar 143 is in turn mounted upon collar 142.

Sleeve 140 has respective annular, transverse, peripheral end flanges 144 and 145, flange 144 being proximate to shaft portion 93a. Flange 145 has four through-and-through openings 146 which are equally spaced around the circumference thereof. Flange 144 has through-and-through openings 147 in correspondence with and in respective lateral alinement with the openings 146. A rod 148 extends through each pair of alined openings 146 and 147. Rod 148 extends slidably through the opening 147, and has a collar 149 which extends slidably through the opening 146.

Shaft 150 extends frictionally and slidably through shaft 91 and into the enlarged bore of shaft portion 93a. Shaft 150 protrudes a short distance out of the end of the bore of shaft 91 outwardly of mandrel holder 81. Sleeve 151 is slidably mounted upon shaft portion 93a. Shaft portion 93a has a pair of diametrically opposed, axially elongated slots 152. Pin 153 extends through shaft 150, through the respective slots 152 and through respective diametrically opposed openings in the sleeve 151, so that an axial movement of shaft 150 produces an axial movement of sleeve 151.

Sleeve 151 has a transverse circumferential flange 154. Each shaft 148 has a circumferentially extending, transverse outer end flange 155 and a similar flange 156, which is slightly spaced from flange 155. Said flange 154 extends turnably into the space between the flanges 155 and 156, as shown in Fig. 6. Accordingly, shaft 150 and the four shafts 148 move in unison. Coil spring 157 is mounted on shaft 148 between flange 144 and flange 156 and urges shaft 150 outwardly.

As shown in Figs. 5 and 6, as well as in other views, the mandrel 80 includes four interfitting peripheral wall segments 158, which together make up a substantially cylindrical peripheral mandrel wall. Each said mandrel segment 158 has fixed thereto inwardly extending flanges 159. One flange 159 is located proximate to and inwardly of flange 144. The other flange 159 is located proximate to and outwardly of flange 145. Shaft 148 has a pair of further collars 160 mounted thereon. Said collars 160 respectively have outer and inner tapered portions 161 which are normally respectively located within correspondingly tapered bores 162 of the respective flanges 159. This is clearly shown on the right side of Fig. 6. The mandrel 80 on the right side of Fig. 6 is a fully expanded mandrel. In this position, the flanges 159 of the mandrel segments 158 are clamped to the flanges 145 of the turnable sleeve 140 by the cams 160, collar 149, shaft 148 and spring 157, so that mandrel 80 is freely turnable upon shaft 91.

Each mandrel segment 158 has spaced end tongues 163 to define cut-outs 164 between adjacent tongues 163. The tongues 163 of adjacent lateral segments 158 register with and are slidable in the respective cut-outs 164 of the adjacent mandrel segments, as is clearly shown on the right side of Fig. 6 and in other views. Accordingly, in the normal expanded position of the mandrel 80, it has a substantially smooth outer peripheral face, because the gaps at the junctions of the respective mandrel segments 158 are small and are staggered. However, it will be apparent that the mandrel 80 may be contracted until the gaps at the junctions of the mandrel segments 158 are reduced to zero, at which point the diameter of the mandrel 80 is reduced.

As is clearly shown in Fig. 5, each mandrel segment 158 has inwardly extending flanges 165 at its respective ends. Accordingly, at each junction of a pair of mandrel segments 158 there are opposed flanges 165. Such sets of opposed flanges 165 may optionally be located at the respective ends of the mandrel 80. Rod 166 extends slidably through respective openings in the respective flanges 165 and has enlarged end heads 167. A coil spring 168 mounted on rod 166 between one of the flanges 165 and the adjacent head 167 urges the segments 158 towards each other.

It will be apparent from the previous description of the operation of the mandrel holder 81, that each of the mandrels 80 successively occupies four positions. For convenience, the position of mandrel 80 at the left in Fig. 3 will hereinafter be referred to as position I. While mandrel 80 is in position I, paper 17 is wound upon the periphery of the mandrel to form a drum 169. At the conclusion of the winding of the drum 169, mandrel 80 next moves to position II, at the top of Fig. 3. This is an idling position of mandrel 80. When the four mandrels are indexed another quarter of a revolution, the mandrel 80 carrying the completed drum 169 moves to position III shown at the extreme right of Fig. 3. As will be described in detail below, mandrel 80 is collapsed while it is in position III, permitting the completed drum 169 to be stripped therefrom. The stripped mandrel 80 next moves to position IV shown at the bottom of Fig. 3. In this position, mandrel 80 is optionally driven so as to give it momentum when it returns to the winding position I, which occurs at the next indexing movement of mandrel holder 81.

*Drive means for the mandrel*

As is clearly shown in the drawings, the free end of each shaft 91 which supports a respective mandrel 80 is unsupported, except when its associated mandrel is in the winding position I. The free end of shaft 91 in position I thereof is clearly shown in Figs. 2 and 6.

Frame 10 includes a vertical leg 10c to which a forwardly extending block 174 is fixed. Frame 10 has a horizontal frame arm 10d located below the block 174 and extending forwardly with respect to frame leg 10c. Lever 175 is connected at its lower end to frame arm 10d by means of lateral pivot 176. Spring 177 connects frame leg 10c and lever 175 and urges the upper end of lever 175 toward frame leg 10c.

The inner face of lever 175 has a cam 175a mounted thereon. This cam 175a has a lower face 179 which slopes upwardly and rearwardly, and a recess 178 located just above the cam surface 179. This recess 178 communicates with the front face of the cam 175a, and also communicates with the inner face of cam 175a. The upper and lower surfaces of the recess 178 converge toward each other, as shown in Fig. 2.

As mandrel 80 moves from position IV to position III, the cylindrical outer bearing 143 rides upwardly and rearwardly upon the surface 179, thereby urging lever 175 away from frame leg 10c, until bearing 143 rides into the recess 178. Bearing 143 then also abuts the rear face of block 174. It will be apparent that bearing 143 is then held firmly so as turnably to support the free end of shaft 91.

When mandrel 80 is moved from position I to position II, bearing 143 rides upwardly on the upper face of recess 178, thereby urging lever 175 away from frame leg 10c, until the bearing 143 rides clear of lever 175.

The drive means for mandrel 80, when in its winding position I, are clearly shown in Figs. 1, 3 and 4. A pair of lateral shafts 182 and 183 are turnably mounted in frame 10 rearwardly of mandrel 80 (position I). Shaft 183 is located behind and slightly below shaft 182. Pulley 193 is mounted upon shaft 183 laterally outwardly of frame arm 9. Pulley 193 is coupled to one of the pulleys 20 on the motor shaft 19 by means of pulley belt 194, so that motor 18 drives shaft 183.

A plurality of laterally spaced pulleys 181 are mounted upon shaft 183. A plurality of laterally spaced pulleys 180 are mounted upon shaft 182 and are respectively longitudinally alined with respective pulleys 181. The pulleys 181 serve as drive pulleys, and pulleys 180 serve as idler pulleys.

Additional tensioning pulleys 186 are supported by means of a pair of brackets 185a. These brackets 185a are fixed to frame 10 at the respective sides thereof at the base of the machine. Lever arms 184 are respectively connected to the brackets 185a by means of respective lateral pivots 185 and extend upwardly and forwardly therefrom. The upper ends of the lever arms 184 are connected by a common shaft (not shown), upon which the pulleys 186 are turnably mounted. These pulleys 186 are laterally spaced and are respectively longitudinally alined with the respective sets of pulleys 180 and 181. Arms 188 are respectively connected to the respective levers 184 by means of respective lateral pivots 187. Said arms 188 extend forwardly and downwardly from the pivots 187 and extend slidably through respective openings in a transverse bracket 189 which is fixed to frame 10. Each arm 188 has a front end head 190. A spring 191 is mounted upon each arm 188 between bracket 189 and head 190, and urges arms 188 forwardly.

Pulley belts 192 extend around the respective sets of pulleys 180, 181 and 186. Said pulley belts 192 frictionally engage the front rear portion of the peripheral face of mandrel 80 in its winding position I, as is clearly shown in Fig. 3. Accordingly, the winding mandrel 80 is driven by motor 18 at a selected rate of speed, and in a clockwise direction as taken in Fig. 3. Preferably, the pulley belts 192 drive mandrel 80 at a rate of speed which tends to carry the web of paper 17 at a linear speed which is slightly greater than its speed at drive roller 14, so as to maintain the paper under tension. The tension of the paper upon the mandrel 80 will cause slippage thereof relative to the pulley belts 192 if the belts 192 tend to drive mandrel 80 too fast. The proper tension of the pulley belts 192 upon the winding mandrel 80 can be adjusted by regulating the position of the stop head 190 upon arm 188, so as to control the tension of spring 191.

Optionally and preferably, when mandrel 80 is in position IV, said mandrel 80 engages the pulley belt 192 so as to exert a slight frictional pressure thereon, as shown in Fig. 3. Accordingly, in position IV, mandrel 80 tends to turn, although there is a certain amount of slippage because the free end of shaft 191 is unsupported in position IV. The advantage of this is that mandrel 80 will already be rotating as it is indexed from position IV to position III. Since mandrel 80 already has turning momentum as it reaches its winding position I, there is little tendency for the continuously moving web of paper 17 to bunch up.

The plurality of belts 192 tend to smooth out the paper as it is wound upon mandrel 80 and to spread it evenly laterally over the surface of the mandrel 80. In addition lateral smoothing roller 195 is mounted so as to press down upon the top of mandrel 80 in its winding position. Said roller is turnably supported at its ends by side arms 196. These arms 196 extend downwardly and rearwardly from roller 195 and are turnably mounted upon shaft 182. It will be apparent that roller 195 is mounted in such a way that it is moved out of the way by mandrel 80 while it is moving from position I to position II, and then drops down again upon the next winding mandrel 80.

*Paper guide means*

As is clearly shown in Fig. 3, throat 198 is fixed to frame 10 between the asphalt station and mandrel 80 (in winding position I), so as to guide the paper 17 between these points. Said throat 198 has spaced upper and lower, longitudinally and laterally extending plates 199 and 200. The rear portion 200a of plate 200 slopes downwardly. Plate 200 is bent downwardly in front of its portion 200a to provide a recess 201 into which compressed air may be forced through a suitable opening. Said air moves through throat 198 in the direction of arrow 202.

Plate 199a is hinged to frame 10 forwardly of throat 198 and normally serves as a continuation of the upper plate 199. Plate 199a extends forwardly to a point just above the winding mandrel 80. Plate 199a is raised similarly to roller 195 by the indexing mandrel 80 moving from position I to position II.

After a length of paper has been cut by knife blade 41, and while the first portion of the new length of paper is passing over the glue and asphalt station, both of the rollers 68 and 70 are in their up positions, because the first turn of paper on mandrel 80 is to be uncoated. The kraft paper is relatively stiff, so that even though the new length is unsupported from the top of bracket 35 to throat 198, the paper sags only slightly downwardly. Accordingly, the front edge of the new length of paper strikes the downwardly inclined portion 200a of the bottom wall 200 of throat 198, and rides up said inclined wall portion until it passes over the recess 201 through which the compressed air enters the main portion of throat 198. The compressed air then tends to maintain the paper in the space between the walls 199 and 200, and the paper is sufficiently stiff so that the drive roller 14 continues to advance the paper until its leading edge is frictionally engaged between roller 195 and mandrel 80. Plates 199 and 199a serve as upper limits to the movement of the paper. In effect, therefore, the new length of paper is automatically threaded upon the winding mandrel 80.

Each mandrel 80 has associated therewith deflection plates 209 and 210, in order to insure that the initial turn of paper will be properly carried around the mandrel 80. Said plates 209 and 210 extend laterally across the machine. Plates 209 and 210 may be fixed in position relative to the mandrel holder 81 by any suitable means which will not be described in detail. Plate 209 is spaced radially outwardly from the periphery of mandrel 80 and conforms approximately thereto in shape. Plate 209 extends from a point slightly in front of roller 195 to a point slightly below the horizontal center line of mandrel 80 (position I). Plate 210 is also spaced radially outwardly from the periphery of mandrel 80 and extends past the lower edge of plate 209 and to a point approximately below the lowest point of mandrel 80 (position I). Accordingly, the leading edge of the new length of paper 17 first passes under roller 195, then travels in the channel between mandrel 80 and plate 209, then travels in the channel between mandrel 80 and plate 210 and is finally engaged frictionally between pulley belts 192 and mandrel 80, to complete the automatic threading operation. When the leading edge of the paper 17 returns to its starting point on mandrel 80, it is held against mandrel 80 by the second layer of paper and by the roller 195.

*Means for collapsing the mandrel*

After the complete drum 169 (Fig. 3) is wound upon mandrel 80 in position I, the wound mandrel is indexed to the optional position II, which is an idling position. In practice, it has been found desirable to limit each indexing movement of mandrel holder 81 to one quarter of a revolution, making necessary the four positions. Position II provides a short delay period, if necessary, during which the coatings of the drum layers cool and set slightly. Mandrel 80 is then automatically contracted in diameter as it is moved to position III, thereby permitting stripping of drum 169 off its unsupported end, said stripping operation being performed by any suitable means which may be manual.

The means for holding mandrel 80 contracted in position III are clearly shown in Figs. 5 and 6. A substantially semi-circular angle iron 170a is fixed to frame angle iron 10a so as to be upstanding with respect thereto. This angle iron 170a is located outwardly of mandrel holder 81. Angle iron 170a has a vertical portion, to the inner face of which a cam 170 of selected size and shape is fixed. This cam 170 is elongated in a vertical direction and is positioned outwardly of and in lateral registration with shaft 150 in position III of mandrel 80. Cam 170 extends above and below shaft 150 in position III.

Shaft 150 has an outer end recess 172 in which a bearing wheel 171 is located. Said bearing wheel 171 is turnably mounted upon a pivot 172 which extends across recess 172. The ends of pivot 172 are fixed to opposed walls of recess 172. Pivot 172 extends laterally when mandrel 80 is in position III. Bearing wheel 171 protrudes slightly beyond the free end of shaft 150.

Normally, shaft 150 is clear of angle iron 170a. However, as mandrel 80 moves into position III, bearing wheel 171 rides upon cam 170, and shaft 150 is forced inwardly, against the action of springs 157. The cams 161 are thereby moved out of the openings 162, the shafts 148 of lesser diameter than the cams 161 being then located in the openings 162. As a result, the action of springs 168 draws the mandrel segments 158 toward each other to contract the diameter of mandrel 80 and make possible the removal of drum 160 therefrom.

As mandrel 80 moves toward position IV, bearing wheel 171 rides off cam 170, and the cams 161 ride back into the openings 162, thereby again expanding the mandrel 80.

The cycle of operations will be assumed to start at an instant when knife blade 41 has just descended to cut the paper 17. While the trailing end portion of the old length of paper 17 is being wound upon the winding mandrel 80 (position I), the new length of paper continues to advance directly behind the old length of paper. Just as the new length of paper reaches the roller 68, the application of glue to the old length of paper ceases. At this instant, the bearing wheels 77a and 77 respectively ride upon the respective cam projections 76 and 75a, so that both of the rollers 68 and 70 are raised. Accordingly, the initial portion of the new length of paper does not touch either the glue roller 32 or the asphalt roller 34.

The new length of paper enters throat 198. Just before the leading edge of the new length of paper reaches the old winding mandrel 180, the trailing edge of the old length of paper passes under the roller 195. At this instant, cam projection 116 rides against button 113 for an instant. Rod 111 is pushed forwardly, thereby moving rod 107 in the direction of arrow 134 and turning lever 103 to actuate the one revolution clutch in clutch housing 98. Since cam projection 116 immediately rides past button 113, the clutch lever 103 immediately returns to its normal position, thereby preventing operation of the one revolution clutch for a second time. During the engagement of the one revolution clutch, motor 95 drives sprocket 104 so as to turn the mandrel shaft 82 one-fourth of a revolution in a counterwise direction as taken in Fig. 3.

The momentary forward movement of rod 111 also causes the free end of lever 128 to be raised, so as to clear lever 129 from recess 130, as a result of which lever 120 is moved so as to clear cam projection 117 from recess 121 and permit said turning movement of shaft 82.

At the end of the one-quarter revolution of shaft 82, the cam projection 117 associated with the new winding mandrel 81 is engaged by lever 120, so that the new winding mandrel 81 is exactly located in its winding position I.

As a result of the indexing movement of mandrel holder 81, the mandrel 80 carrying the newly completed drum 169 is moved to position II. The mandrel 80 previously in position II is moved to position III, its associated bearing wheel thereby riding upon cam 170 to contract the mandrel and permit the stripping of drum 169 therefrom. The mandrel 80 previously in position III is moved to position IV and expands to its normal diameter. The mandrel 80 previously in position IV is moved to position I and is given an initial turning impetus by the drive belts 192. In position I, the free end of mandrel 80 is turnably and releasably supported, and it is driven by the belts 192. As a result of said initial turning impetus, as well as the rapidity of the indexing movement of mandrel holder 81, the new mandrel 80 in position I receives the new length of paper 17 without any difficulty.

The new length of paper 17 is threaded onto mandrel 80 by means of roller 195, deflection plates 209 and 210 and belts 192, so that turns of paper are successively wound upon the mandrel to build up the completed drum 169.

After a portion of the new length of paper 17, corresponding to one turn thereof upon mandrel 80, has passed the roller 68, the cam wheel 77 rides off the cam projection 78a, so that roller 68 drops and the paper is engaged between said roller 68 and the glue roller 62. Accordingly, a length of paper corresponding to a selected number of turns thereof upon mandrel 80 are coated with glue. As an example, a length of paper corresponding to nine turns is coated with glue. Cam wheel 77 then rides upon cam 75, and almost immediately thereafter cam wheel 77a rides over the cam projection 76. As a result, the paper is now engaged between the roller 70 and the asphalt roller 34, so that the paper is coated with asphalt. Just before a length of paper corresponding to two turns upon the mandrel (as an example) has been thus coated with asphalt, cam wheel 77 rides off cam projection 75, so that the paper again is coated with glue. Almost immediately thereafter, cam wheel 77a again rides upon cam projection 76, so that the coating of the paper with asphalt ceases. As a result, the last two turns of the paper (as an example) are coated with glue. When the shaft 49 completes a revolution, cam 61 drops into recess 57, as a result of which knife blade 41 drops and cuts the paper, thereby concluding the described cycle of operations.

While I have disclosed a preferred embodiment of the invention and have indicated various changes, additions and omissions which may be made therein, it will be apparent that various other changes, omissions and additions may be made in the invention without departing from the spirit and scope thereof.

It will be apparent that the thickness of the drums 169 may be varied by varying the linear speed of travel of the paper 17 relative to the speed of turning of cam shaft 49. The cams 73 and 74 may be readily replaced in order to vary the manner in which the turns of paper are coated.

The mandrels 80 may be readily replaced by mandrels of different diameter, in order to produce drums 169 of different diameter. Accordingly, one basic machine may be used in the production of drums of a number of different diameters. In order to remove a mandrel 80 from its shaft 91, it is only necessary to remove the bearing 142 and the collar 141 from shaft 91, and to remove pin 153 from shaft 150. It is then possible to slide sleeve 140 off shaft 91 and replace the mandrel. Since the ends of the mandrel are open, it is relatively simple to remove these parts. The manner in which the parts 142, 141 and 153 are assembled is not shown in detail in the drawings, but it will be apparent that these parts may be assembled in such a manner as to make it easy to remove and then replace them.

While I have disclosed a preferred embodiment of my invention and have indicated various changes, omissions and additions which may be made therein, it will be apparent that various other changes, omissions and additions may be made in my invention without departing from the scope or spirit thereof.

I claim:

1. A mandrel assembly comprising a longitudinal frame, a mandrel holder mounted on said frame for rotation about a lateral axis, a plurality of equally spaced, laterally extending mandrels turnably mounted on said mandrel holder, a motor, means including a one-revolution clutch coupling said motor to said mandrel holder, a first lateral shaft turnably mounted on said frame behind said mandrel holder and coupled to said clutch, a first lever fixed to said first shaft and extending forwardly therefrom and having a recess in the bottom face thereof, means normally maintaining said first shaft in a position to maintain said clutch disengaged and intermittently turning said first shaft in a direction to raise said first lever to a position of said first shaft in which said clutch is engaged, a plurality of equally spaced stops mounted on said mandrel holder, a second lateral shaft turnably mounted on said frame below said first shaft, a second lever fixed to said second shaft and depending therefrom, a third lever mounted on said frame by means of a lateral pivot and depending therefrom and located in front of said second lever and having a recess in the front face thereof, means coupling said second lever and said third lever so that rearward movement of said second lever carries said third lever rearwardly and forward movement of said second lever carries said third lever yieldably forwardly, a fourth lever fixed to said second shaft and extending upwardly therefrom, the upper end of said fourth lever being normally engaged in the recess of said first lever and said third lever being thereby positioned and adapted to receive one of said stops in the recess thereof to hold one of said mandrels in a selected operating position relative to said frame, and a fifth lever fixed to said second shaft and extending forwardly therefrom, said fourth lever being adapted to be released by said first lever when said first lever is moved to its clutch-engaging position and said fifth lever being adapted to move said third lever out of its stop-engaging position when said fourth lever is so released, said motor being then adapted to turn said mandrel holder sufficiently in a selected direction to move a new mandrel into operating position, and a plurality of equally spaced cams carried by said mandrel holder and positioned and adapted to engage the free end of said fifth lever momentarily during the turning movement so as to raise said fifth lever and return said fourth lever to its position for re-engagement in the recess of said first lever, whereby the new mandrel is adopted to be locked in operating position by said fourth lever.

2. A collapsible mandrel assembly comprising a longitudinally extending, hollow main shaft having front and rear ends, a mandrel holder supporting said main shaft adjacent its front end, a bearing sleeve turnably mounted on said main shaft and having transverse, outwardly extending flanges at its respective ends, a plurality of longitudinally extending auxiliary shafts each extending slidably through alined openings in the respective flanges with close tolerance and extending forwardly of said front flanges, a plurality of longitudinally extending, part cyclindrical, peripheral mandrel segments located radially outwardly of said sleeve flanges, said mandrel segments respectively having inwardly extending, longitudinally spaced flanges with openings therein, and located behind the front sleeve flange, each said auxiliary shaft also extending loosely slidably through the openings of respective mandrel flanges, each said auxiliary shaft carrying collars of enlarged diameter which are respectively adapted to slide with close tolerance into and out of the openings of said respective mandrel flanges, said mandrel segments collectively defining a substantially cylindrical mandrel, adjacent mandrel segments being circumferentially spaced when said collars are in said mandrel flange openings, means urging adjacent mandrel segments toward each other so that the mandrel diameter is to be contracted by withdrawal of said collars from said mandrel flange openings, said collars having cam-shaped front portions adapted to enter said mandrel flange openings, stop means respectively mounted on the front ends of said auxiliary shafts, spring means respectively coupling said mandrel flanges and said stop means so as to normally maintain said collars in said mandrel flange openings, a control shaft slidably positioned within the bore of said main shaft and protruding out of the front end thereof, said main shaft having a longitudinally elongated slot, a radial pin fixed to said control shaft and protruding longitudinally slidably through said slot, a control collar slidably mounted on said main shaft in front of said flanges and engaged by said pin, and means carried by said control collar and engaging all of said stop means so that said auxiliary shafts move longitudinally in unison with said engaging means but are freely turnable relative thereto about the axis of said main shaft, whereby rearward movement of said control shaft is adapted to produce movement of said auxiliary shaft collars out of said mandrel flange openings for mandrel contraction, said spring means being operative to return said auxiliary shaft collars into said mandrel flange openings for mandrel expansion upon release of the rearward force on said control shaft.

3. A collapsible mandrel assembly comprising a mandrel holder, a bearing member, means turnably mounting said bearing member on said mandrel holder, spaced transverse support flanges carried by said bearing member, a plurality of auxiliary shafts each extending frictionally slidably through alined openings in the respective support flanges, a plurality of part cylindrical, peripheral mandrel segments located radially outwardly of said flanges and having inwardly extending, spaced transverse mandrel flanges, with openings therein, each said auxiliary shaft also extending loosely slidably through the openings of respective mandrel flanges, each said auxiliary shaft carrying collars of enlarged diameter which are respectively adapted to be frictionally slidably located in the openings of said respective mandrel flanges, said mandrel segments collectively defining a substantially cylindrical mandrel, adjacent mandrel segments being circumferentially spaced, spring means coupling said auxiliary shaft and said support flanges and normally maintaining said collars in said mandrel flange openings, means movably carried by said mandrel holder and adapted to engage said auxiliary shafts to move same against the action of said spring means to move said collars out of said mandrel flange openings, and means urging adjacent mandrel segments toward each other so that the mandrel diameter is adapted to be contracted by withdrawal of said collars from said mandrel flange openings, said collars having cam entrant portions for re-entrance into said mandrel flange openings upon release of the force of said engaging means.

References Cited in the file of this patent

UNITED STATES PATENTS

| | | |
|---|---|---|
| 923,553 | Mill | June 1, 1909 |
| 1,112,351 | Beadle | Sept. 29, 1914 |
| 1,133,424 | Beadle | Mar. 30, 1915 |
| 1,345,459 | Pierce | July 6, 1920 |
| 1,399,636 | Malm | Dec. 6, 1921 |